United States Patent [19]

Bryngelson

[11] 4,116,373

[45] Sep. 26, 1978

[54] TWO POSITION SPARE WHEEL MOUNT FOR THE SIDEWALL OF A PICKUP TRUCK

[76] Inventor: James R. Bryngelson, Grand Rapids, Minn.

[21] Appl. No.: 793,529

[22] Filed: May 4, 1977

[51] Int. Cl.$^2$ ............................................. B62D 43/00
[52] U.S. Cl. .................................. 224/42.21; 214/451
[58] Field of Search ............... 224/42.06, 42.08, 42.12, 224/42.21, 42.23, 42.24, 42.25, 42.28, 42.45 R; 296/37.2; 214/451, 454; 248/291

[56] References Cited

U.S. PATENT DOCUMENTS

| | | | |
|---|---|---|---|
| 2,052,970 | 9/1936 | Erbeck | 214/454 |
| 2,653,002 | 9/1953 | Passman | 248/291 |
| 3,283,973 | 11/1966 | Wargo | 224/42.21 |
| 3,365,084 | 1/1968 | Fernicola | 224/42.21 X |
| 3,598,296 | 8/1971 | Gostomski | 224/42.21 X |
| 3,845,891 | 11/1974 | Becher | 224/42.21 |

Primary Examiner—Trygve M. Blix
Assistant Examiner—Winston H. Douglas

Attorney, Agent, or Firm—Wicks & Nemer

[57] ABSTRACT

A two position spare wheel mount for the sidewall of a pickup truck which includes a flat base. A pivotal and rotatable wheel mount formed of rod material and having an inner end portion rotatably mounted in a pin with the pin pivotally mounted within a semi-cylindrical member mounted on the base. The semi-cylindrical member has a slot through which the inner rod end extends and which allows the pivotal movement. The other end of the inner rod portion terminates in an obliquely and downwardly disposed rod portion which in turn terminates in the outer end portion which is substantially parallel to the inner end portion. The outer end portion is threaded and equipped with washers and a pair of nuts for engagement with a wheel. The base is secured to the upper horizontal surface of the truck sidewall by means of nut-equipped bolts whereby the mount may be pivoted and rotated to a position within the sidewall or one where the wheel is against the outer surface of the sidewall.

6 Claims, 3 Drawing Figures

TWO POSITION SPARE WHEEL MOUNT FOR THE SIDEWALL OF A PICKUP TRUCK

SUMMARY

The invention relates broadly to devices for mounting spare wheels on vehicles and more particularly to a device for selectively mounting a spare wheel on the inside of the sidewall of the box of a pickup truck or on the outside of the sidewall which provides more room in the box.

It is a feature of the invention to provide a wheel mount which simply and securely mounts a wheel on the inside of the sidewall of a pickup and which may simply and easily be moved to a position mounting the wheel on the outside of the sidewall of the pickup. With the wheel positioned in the box of the pickup the same is maintained relatively clean while with the wheel on the outside of the sidewall more room in the pickup box is available when and if desired. Also with the wheel mount mounted on the outside of the sidewall it is easily accessible for mounting or demounting a wheel thereon or therefrom.

The invention will appear more clearly from the following detailed description when taken in connection with the accompanying drawings, showing by way of example a preferred embodiment of the inventive idea wherein like numerals refer to like parts throughout.

In the drawings forming part of this application:

Figure 1:
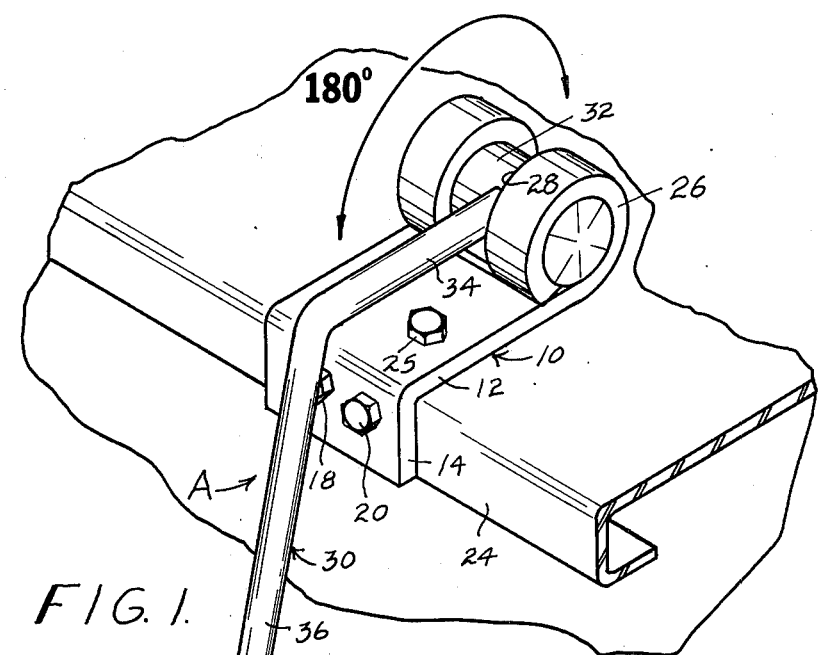
FIG. 1 is a perspective view of a two position spare wheel mount shown as mounted on the sidewall of a pickup truck in the inner position and embodying the invention.

Referring to the drawings in detail, the two position spare wheel mount A for a wheel includes the base 10. The base 10 includes the flat body position 12 which terminates at one end in the right angular flange 14. The flange 14 is formed with a pair of spaced holes 16 through which are extended the nut-equipped bolts 18 and 20. The bolts also extend through spaced holes 22 formed in the flange 24 formed as part of the body sidewall S. The base 10 is further secured to the sidewall S by the nut-equipped bolt 25.

The other end of the flat body portion 12 terminates in the partial cylindrical formation 26 which is formed with the transverse slot 28. The numeral 30 designates a pivotal and rotatable mount or support member which includes on the inner end thereof the pin 32 which rotatably fits within the cylindrical formation 26. The pivotal mount further includes the straight rod base portion 34 the outer end of which is rotatably mounted within a hole 35 formed in the pin 32 and the base portion extends from the pin 32 through the slot 28. The portion 34 is prevented from displacement from the hole 35 by the peened end 37. The portion 34 is rotatable at least 180° within the hole 35 to be moved from the position of FIGS. 1 and 2 to that of FIG. 3. The outer end of the rod ortion 34 terminates in the obliquely disposed rod portion 36 which in turn terminates in the outer end portion 38 which is substantially parallel to the base rod portion 34. The outer end of the rod portion 38 is threaded as at 40 and equipped with the nuts 42 and 44 together with the washers 46 and 48.

The length of the rod portion 36 is such that when the wheel W is secured to the end 38 the tire T rests substantially on the floor F of the pickup truck. The outer end portion of the threaded portion 40 of the mount 30 is formed with the hole 50 through which is secured the bail portion of the conventional padlock P thereby discouraging removal of the wheel and tire from the mount 30.

Figure 2:
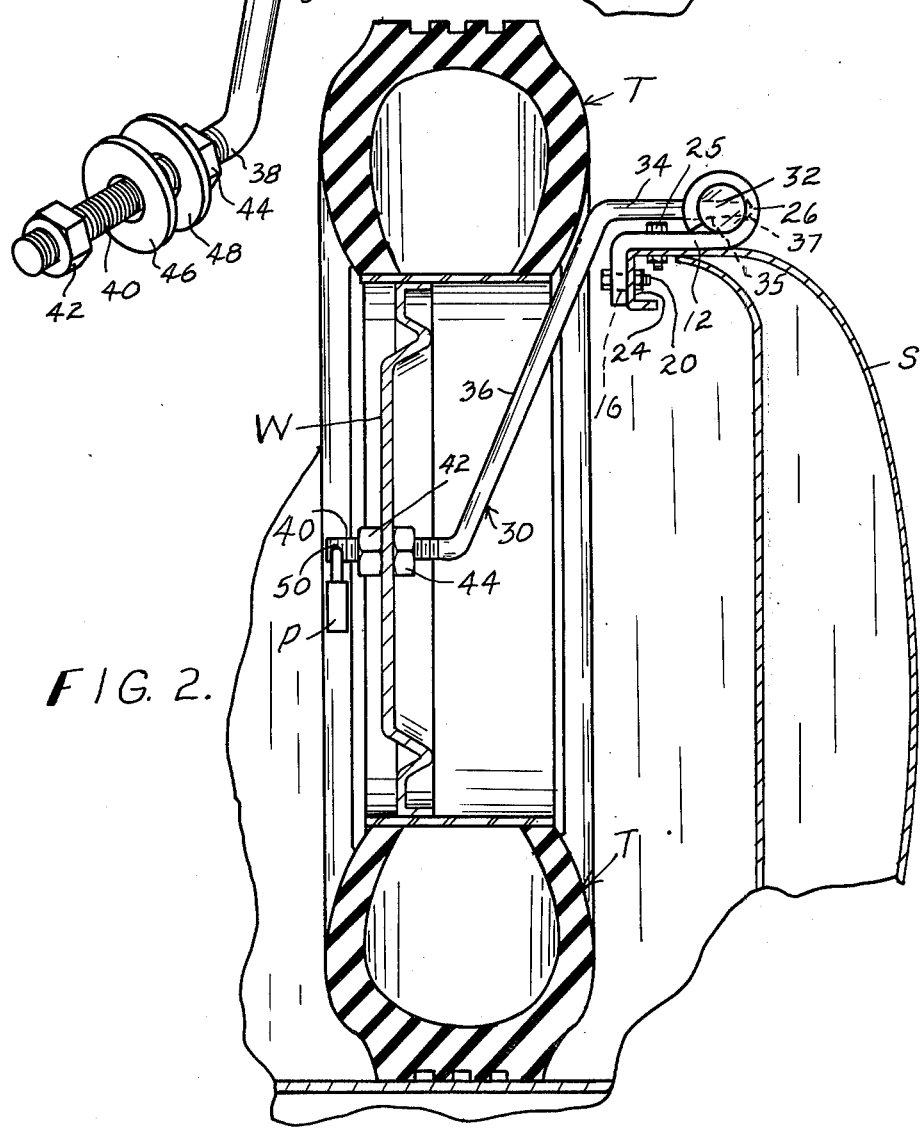
FIG. 2 is a sectional view through a tire and wheel mounted on the mount as in FIG. 1 with the bottom of the tire shown as resting on the bottom of a pickup truck on which the mount is mounted.

The device is used as follows:

The pivotal mount or support member 30 is pivoted into the position of FIGS. 1 and 2 upon the pin 32 and then the threaded end 40 of the mount is extended through a lug hole in the wheel W with the nut 44 on one side of the wheel and the nut 40 drawn up against the other side of the wheel. The wheel may hang free of the floor F or upon the floor depending upon the distance of the floor from the top of the sidewall of the pickup. The padlock P may then be applied as outlined above.

Figure 3:
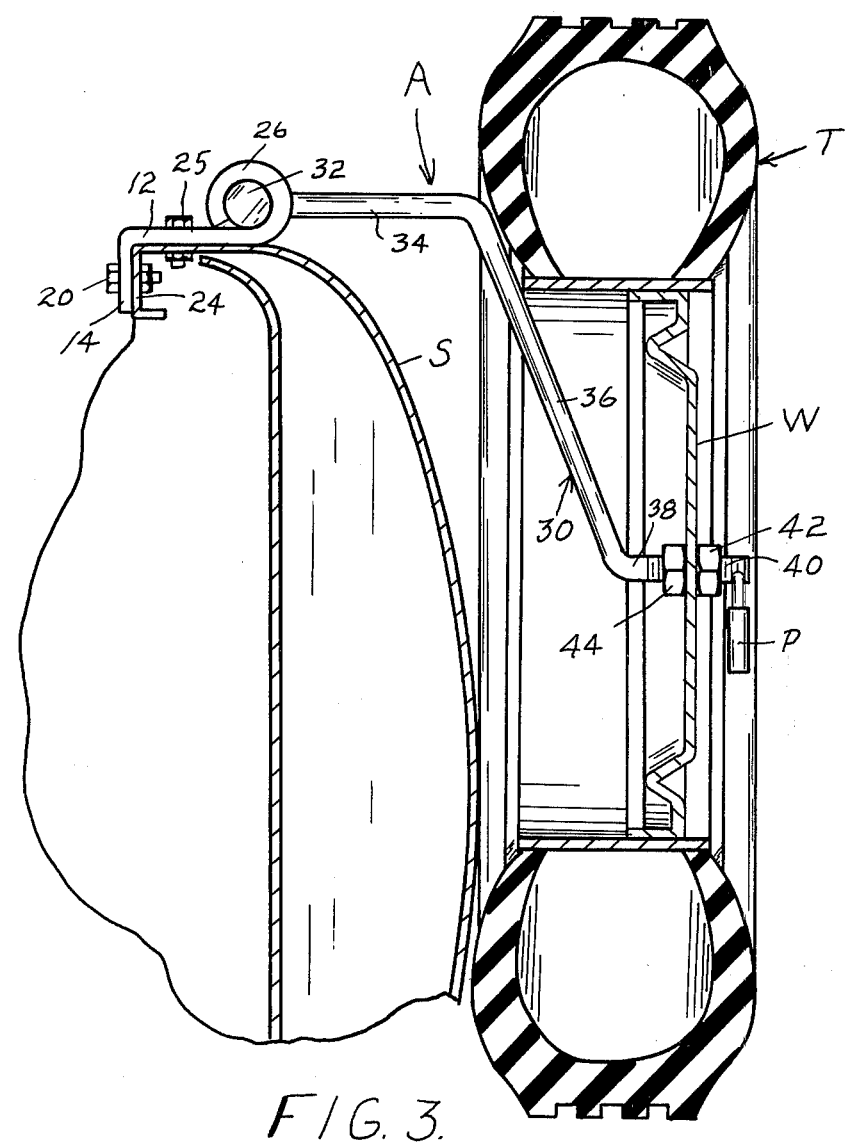
FIG. 3 is a sectional view similar to FIG. 2 but with the mount pivoted 180° and rotated at least 180° thereby placing the mount and wheel and tire thereon in position at the outer surface of the sidewall of the pickup truck.

If it is desired to have more room within the body box of the pickup the mount with the wheel and tire thereon may simply be lifted from the position of FIGS. 1 and 2 and pivoted about the axis of the pin 32 and the end portion 34 rotated at least 180° in the hole 35 of the pin 32 from the position of FIG. 2 to that of FIG. 3 where the wheel and tire hang against the sidewall S. The wheel and tire may also be mounted on the mount 30 when the mount is in the position of FIG. 3. In the position of FIG. 3 it will be seen that the wheel may be easily removed from the mount 30 while standing on the ground adjacent the pickup.

Having thus described the invention, what is claimed as new and desired to be secured by Letters Patent is:

1. A two position spare wheel mount for the sidewall of a pickup truck comprising:
   (a) a base member having
   (b) means for securing the same to the upper surface of the sidewall of a pickup truck,
   (c) an elongated support member having a straight elongated base portion terminating at one end in
   (d) an obliquely disposed elongated portion which terminates in
   (e) a straight elongated outer end portion substantially parallel to said base portion,
   (f) said base portion of said support member having a pin secured to the other end thereof and normal thereto,
   (g) said base member having a hollow cylindrical member secured thereto and in which said pin is pivotally mounted,
   (h) a slot formed in said hollow cylindrical member and through which said base portion of said support member extends to allow said support member to pivot on said pin substantially 180°,
   (i) means rotatably mounting the end of said base portion of said support member in said pin so as to enable said support member to rotate about the longitudinal axis of said base portion,
   (j) said outer end portion having means thereon for securing a wheel thereto.

2. The device of claim 1 in which said support member is formed of rod-like material.

3. The device of claim 2 in which said base member is substantially coplanar with respect to the upper surface of the sidewall when secured thereto.

4. The device of claim 1 in which said base member is substantially coplanar with respect to the upper surface of the sidewall when secured thereto.

5. The device of claim 1 in which said means rotatably mounting the end of said base portion of said support member in said pin includes a hole formed in said pin and in which said base portion is rotatably mounted.

6. A two position spare wheel mount for the sidewall of a pickup truck comprising:
   (a) a base member having
   (b) means for securing the same to the upper surface of the sidewall of a pickup truck,
   (c) an elongated support member having a straight elongated base portion terminating at one end in
   (d) an obliquely disposed elongated portion which terminates in
   (e) a straight elongated outer end portion substantially parallel to said base portion,
   (f) said base portion of said support member having a pin secured to the other end thereof and normal thereto,
   (g) said base member having a hollow cylindrical member secured thereto and in which said pin is pivotally mounted,
   (h) means rotatably mounting the end of said base portion of said support member in said pin so as to enable said support member to rotate about the longitudinal axis of said base portion,
   (i) said outer end portion having means thereon for securing a wheel thereto.

* * * * *